2 Sheets—Sheet 1.
J. ATKINSON.
Apparatus for Heating Water and other Fluids.
No. 202,917. Patented April 30, 1878.
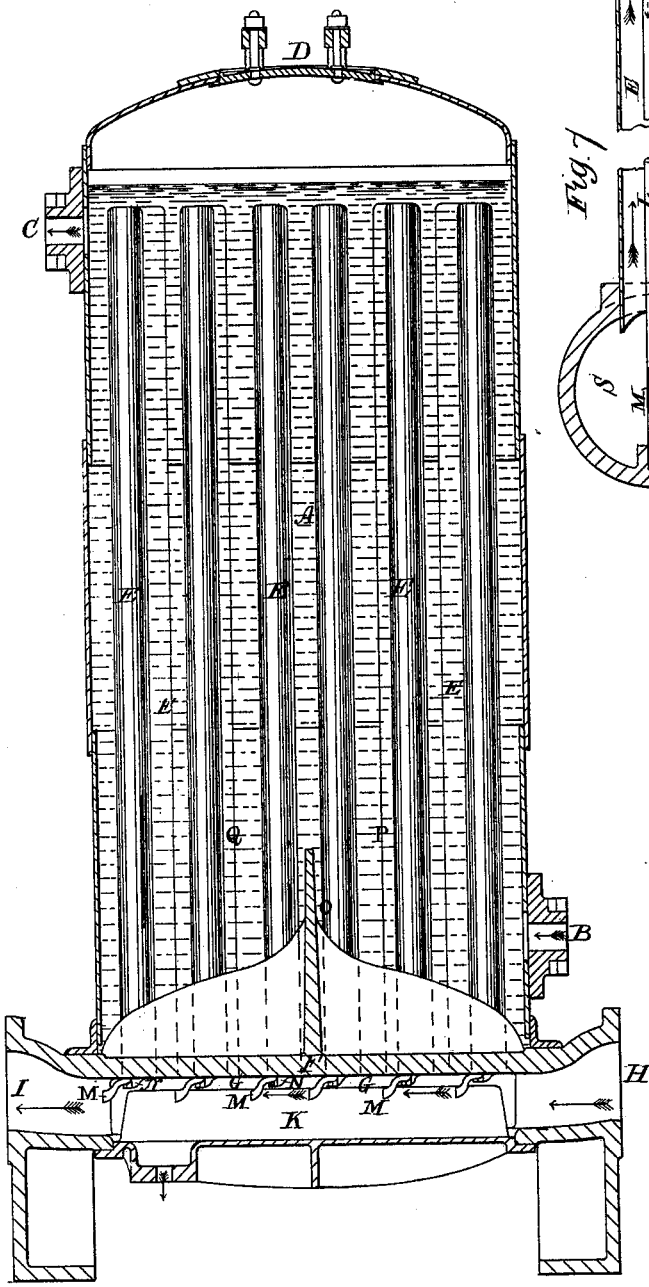
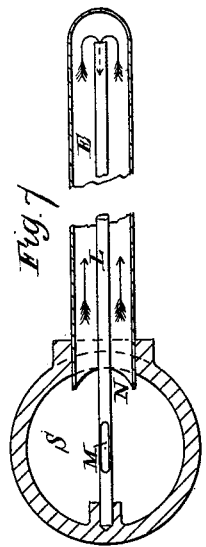
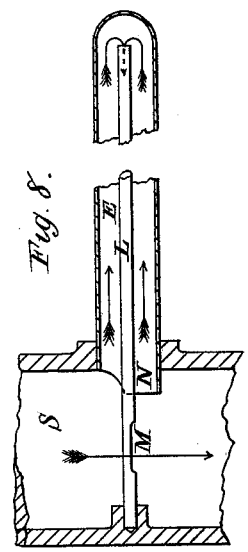
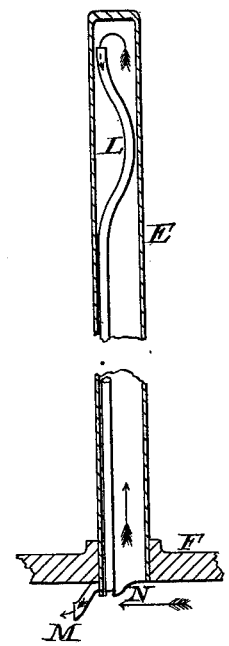
Witnesses.
G. P. Redfern
A. Hyatt
Inventor
James Atkinson J. ATKINSON.
Apparatus for Heating Water and other Fluids.

No. 202,917.    Patented April 30, 1878.

Witnesses.
G. F. Redfern
A. H. Hutt

Inventor.
James Atkinson

UNITED STATES PATENT OFFICE.

JAMES ATKINSON, OF LONDON, ENGLAND, ASSIGNOR OF ONE-HALF HIS RIGHT TO PIERRE AIMABLE VICTOR LE LUBEZ, OF SAME PLACE.

IMPROVEMENT IN APPARATUS FOR HEATING WATER AND OTHER FLUIDS.

Specification forming part of Letters Patent No. 202,917, dated April 30, 1878; application filed October 5, 1877; patented in England, June 26, 1877.

*To all whom it may concern:*

Be it known that I, JAMES ATKINSON, of London, England, have invented, and patented in England June 26, 1877, certain Improvements in Apparatus for Heating Water, Air, or other Fluids, and for surfacely condensing, of which the following is a specification:

My invention relates to tubular apparatus for heating water, air, or other fluids by means of steam, either exhaust-steam from an engine or any other source, or fresh steam, or any other condensable vapor, by transferring a portion of the heat contained in it to the fluid to be heated. Similar apparatus may be used for surface-condensers.

One of its most important applications is for heating the feed-water previously to its entering the boiler by means of the available heat contained in the exhaust-steam, thus conducing to economy. For this purpose the apparatus is arranged as hereinafter described, and as shown in the accompanying drawing, in which—

Figure 2:
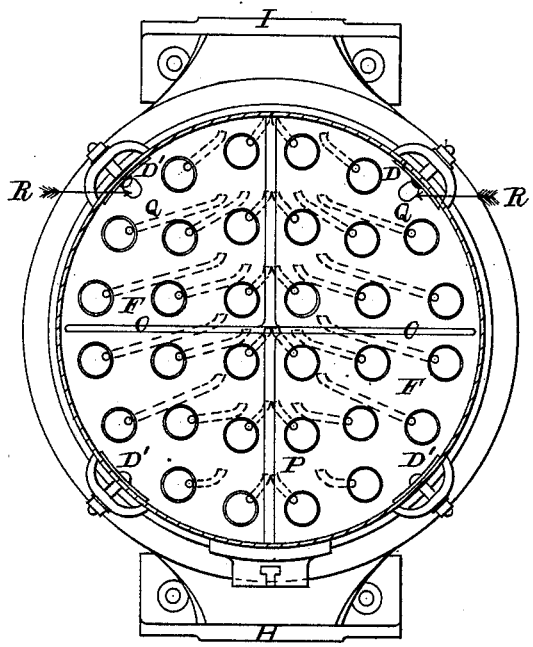
Figure 3:
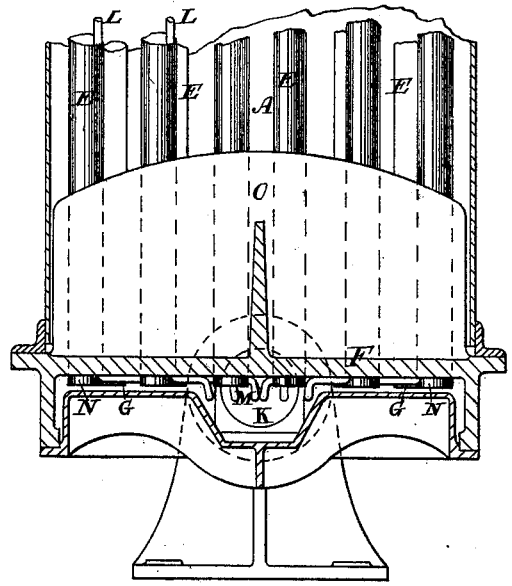

Figure 1 is a vertical section; Fig. 2, a half-sectional plan and a half-plan, looking from below; Fig. 3, an elevation, partly in section; and Fig. 4, a part section through the blow-out opening.

Similar letters in all the figures represent simillar parts.

The water to be heated is contained in a suitable vessel, A, by preference of a cylindrical form, and having its axis placed vertically, constructed of cast-iron, wrought-iron, or other suitable material, provided with inlet B, for cold water, toward the bottom; outlet C, for heated water, toward the top; suitable provision for cleaning out, viz., man-hole D and mud-holes D', and such other attachments as may be required. Into this vessel A project a number of tubes, E, hereinafter called "heating-tubes." (In the case of a very small heater a single tube may be sufficient.) These tubes E are closed at the upper ends, and are attached at the opposite ends, by screw-threads or otherwise, to a tube-plate, F, which forms the bottom of the water-vessel A, in such a manner that their external surface is in contact with the water to be heated, and their internal surface in communication with an inclosed space, G, on the other side of or below the tube-plate F.

The exhaust-steam from the engine has a free passage through this space G and across the open mouths of the heating-tubes E, a suitable inlet-opening, H, and outlet-opening, I, being provided for it, and, by preference, restrained principally in passing through this space G to a passage or channel, K, which is direct in its course, and of about the same sectional area as the exhaust-pipe from the engine.

Each of the heating-tubes E is provided with a circulating-tube, L, such circulating-tubes being of considerably smaller diameter than the heating-tubes E, in which they are inserted. These circulating-tubes L form a communication between the upper or closed ends of the heating-tubes E and the exhaust-steam space G, into which they project, and where their mouths or openings M are so arranged that they shall be in the best position for the current or blast of the exhaust-steam to cause an induced current flowing either out of or into them, and thus out of or into the upper or closed ends of the heating-tubes E. The object of these circulating-tubes L is to draw out of or expel any air or other gas which the heating-tubes E may contain when the engine first commences to work, or which may be carried into them with the exhaust-steam, so that, the air being thus removed, steam will take its place; this being continually renewed as it is condensed by being in contact with the inner surface of the heating-tubes E, which transmit the heat thus abstracted to the water surrounding their outer surface.

To assist the induced current through the circulating-tubes L, a portion, N, of the heating-tubes E may project a short distance into the steam-space G, and be shaped or bent into a suitable form for assisting the induced current. Thus, if the mouths M of the circulating-tubes L are turned away from the direction in which the exhaust-steam is coming, then the projecting portions N of the heating-tubes E will tend to scoop up or direct the current of steam into the heating-tubes E, thus assisting each other in causing an induced current into the heating-tubes E, up to their top or closed ends, down the circulating-tubes L, and out at their mouths M, as shown by the arrows; or, if the mouths M of the circulating-tubes L face the direction in which the current of steam is coming, then the projecting portions N of the heating-tubes E will divert the current of steam, causing a diminution of pressure at the mouths of the heating-tubes E, which, assisted by the current of steam blowing into the facing mouths M of the circulating-tubes L, will cause an induced current through the tubes in a reverse direction, and in either case removing the air or other gas, which would otherwise interfere with the free contact of the exhaust-steam with the interior of the heating-tubes E.

In place of allowing a portion of the heating-tube to project, as explained, a projection may be cast on the lower surface of the tube-plate to answer the same purpose.

The circulating-tubes L of any heating-tubes E whose mouths are not in the direct course of the exhaust-steam may have their lower ends carried into a better position, as shown in Fig. 2. In other cases these lower ends may be bent, for facility of fixing in their proper position, or to turn their mouths into a proper position. Straight tubes may be used, having the mouth cut on a slant; or the mouths may consist of openings cut in the side, with the bottom closed. It is obvious that any two or more of the circulating-tubes may be connected together, so as to discharge through one mouth.

The lower portion of the water-cylinder A may be divided by a vertical partition, O; or this partition may be inclined. The cold-water inlet B, delivering into one division, P, keeps the water in that division disturbed, and so prevents it from depositing any of its impurities there; but the water, being undisturbed in the other division Q, allows any impurities to settle there, and from which they may be blown out through a suitable cock or valve fitted to a blow-out outlet, as shown at R.

The heater may be arranged in an inclined or horizontal position, if required; but in no case must the closed ends of the heating-tubes be below their mouths.

The arrangement of the apparatus, when used as a surface-condenser, is similar to that hereinbefore described; but its general form may require to be altered to suit the position in which it may be necessary to place it. The outlet I from the steam-space G will be attached to the suction side of the air-pump, and sufficient water passed through the water-cylinder A to condense the steam. Air or other fluids may be heated by the same arrangement, and by means of any suitable condensable vapor.

Figures 5, 6:
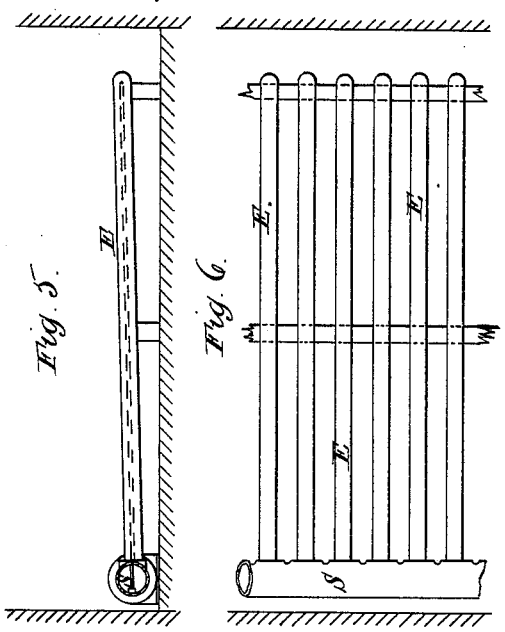

Figs. 5 to 8 show the construction of the apparatus when used for heating liquids in tanks, vats, coppers, or for heating air or gases in stoves, rooms, greenhouses, and in similar instances. Fig. 5 is a sectional elevation; Fig. 6, an enlarged detail of the same; Fig. 7, a part plan, and Fig. 8 an enlarged detail, of the same.

A pipe, S, conveying the heating-vapor, is carried into the lower part of the room, tank, or other place containing the fluid to be heated, and continued for such a length and in such a direction as may be desired to suit the requirements of the case. This pipe is hereinafter called the "main heating-pipe." Branching out from it are the heating-pipes E, which are arranged, as regards their respective circulating-tubes L and their mouths or openings N and M, in a manner similar to that described for the feed-water heater. In these figures the circulating-tubes L are shown straight at their lower ends, which are screwed into, or otherwise fixed to, the main heating-pipe S, with the mouths M cut in the side of the tube; but it will be seen that these mouths M may be arranged as shown for the feed-water heater; also, that the heating-tubes E may branch out on both sides of, or be vertical or inclined to, the main heating-pipe S, as may be required to suit the case in which it is to be used. The steam or other heating vapor passes through or along the main heating-pipe S, causing an induced current, which draws out of or expels the air from the heating-tubes E, as previously described, and comes in direct contact with the inner surface of the heating-tubes E, and thus heats the water, air, or other fluid which is in contact with their outer surface.

The main heating-pipe S may be of any suitable section, and has, by preference, a continuous fall, so as to drain all water or other fluid which may condense in it, or in the heating-tubes, to its outlet end, where suitable valves or openings may be provided for its escape, together with any air or other uncondensable gas which may require removing, either on starting or continuously. An outlet may also be here provided, through which the remaining steam or other heating-vapor may be allowed to pass on to another system of heating-pipes, to be used for any other purpose, or to escape into the air.

The chief advantages derived from my improvements are freedom from straining and leaky joints, due to the heating-tubes E being fixed at one end only, cheapness of manufacture, the slight pressure required to drive the exhaust-steam or other heating-vapor through the apparatus, accessibility, and durability.

Having now fully described and ascertained the nature of my said invention, and the manner of performing the same, I claim the following as being novel and original:

1. The vessel A, having the tubes E and L and pipe S, the inner tube L being open at its top and bottom, and the vessel being provided with a transverse partition, O, extending upward from its bottom, substantially as shown and described.

2. In combination with the vessel A, tubes E and L, pipe S, the passage or channel K, the lower ends of the tubes L projecting into said channel for the purpose of carrying off the air or gas, substantially as set forth.

JAMES ATKINSON.

Witnesses:
G. J. REDFERN,
A. ALBUTT.